United States Patent
Rhein et al.

(10) Patent No.: US 10,122,007 B2
(45) Date of Patent: Nov. 6, 2018

(54) COVER ASSEMBLY FOR A BATTERY MODULE

(71) Applicant: TYCO ELECTRONICS CORPORATION, Berwyn, PA (US)

(72) Inventors: David James Rhein, Memphis, MI (US); Andre Guanco, Royal Oak, MI (US); Eric Shields, High Point, NC (US); Jeremy Patterson, Winston-Salem, NC (US); Scott Cross, Clemmons, NC (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 67 days.

(21) Appl. No.: 15/161,350

(22) Filed: May 23, 2016

(65) Prior Publication Data

US 2016/0380252 A1    Dec. 29, 2016

Related U.S. Application Data (60) Provisional application No. 62/184,624, filed on Jun. 25, 2015.

(51) Int. Cl.
*H01M 2/20*    (2006.01)
*H01M 2/22*    (2006.01)
(Continued)

(52) U.S. Cl.
CPC ............ *H01M 2/26* (2013.01); *H01M 2/043* (2013.01); *H01M 2/1077* (2013.01);
(Continued)

(58) Field of Classification Search
None
See application file for complete search history.

(56) References Cited

U.S. PATENT DOCUMENTS

| | | | |
|---|---|---|---|
| 2012/0276431 A1* | 11/2012 | Groshert | H01M 2/206 429/99 |
| 2012/0328920 A1* | 12/2012 | Takase | H01M 2/1077 429/90 |
| 2015/0333465 A1* | 11/2015 | Ofenbakh | H01R 4/18 29/865 |

FOREIGN PATENT DOCUMENTS

| | | |
|---|---|---|
| EP | 2546906 A1 | 1/2013 |
| JP | 2013143281 A | 7/2013 |

OTHER PUBLICATIONS

International Search Report dated Aug. 30, 2016 received in International Application No. PCT/US2016/037537.

* cited by examiner

*Primary Examiner* — Yoshitoshi Takeuchi (57) ABSTRACT

A cover assembly for a battery module is configured to be coupled to battery cells that are arranged side-by-side in a stacked configuration. The cover assembly includes a housing, a plurality of bus bars, and an electrical cable. The bus bars are held by the housing and are configured to electrically connect to corresponding positive and negative cell terminals of the battery cells to electrically connect adjacent battery cells. The cable extends across the bus bars and is electrically connected to each of the bus bars to monitor voltages across the battery cells. The cable includes plural electrical conductors and a dielectric insulator that surrounds and electrically isolates the conductors. The conductors include exposed segments exposed through the dielectric insulator that are electrically connected to corresponding bus bars via a bonding layer applied between the exposed segment and the corresponding bus bar.

20 Claims, 6 Drawing Sheets

(51) Int. Cl.
  *H01M 2/26* (2006.01)
  *H01M 2/04* (2006.01)
  *H01M 2/10* (2006.01)
  *H01M 10/48* (2006.01)
  *H01M 2/30* (2006.01)
  *H01M 10/42* (2006.01)
(52) U.S. Cl.
  CPC ............ *H01M 2/206* (2013.01); *H01M 2/305* (2013.01); *H01M 10/4257* (2013.01); *H01M 10/482* (2013.01); *H01M 10/488* (2013.01); *H01M 2220/20* (2013.01)

COVER ASSEMBLY FOR A BATTERY MODULE

CROSS-REFERENCE TO RELATED APPLICATIONS

This application claims priority to U.S. Provisional Application No. 62/184,624, filed 25 Jun. 2015, which is incorporated by reference in its entirety.

BACKGROUND OF THE INVENTION

The subject matter herein relates generally to battery modules.

Battery modules, such as those for electric vehicles or hybrid vehicles, typically includes a plurality of cells grouped together to form the battery modules. The battery modules are connected together with a cover assembly to form battery packs. Each of the cells includes positive and negative cell terminals that are electrically connected together via the cover assembly. Different types of battery modules are formed using different types of cells. For example, one type of battery modules are known as pouch type battery modules, another type of battery modules are known as prismatic battery modules, and a third type of battery modules are known as cylindrical battery modules. Prismatic battery modules use prismatic battery cells that are stacked together. The positive and negative cell terminals are connected using bus bars.

Known battery packs typically include electrical components that are configured to monitor the voltage and other characteristics of each of the cells of each of the battery modules. For example, the battery pack may include a central controller that is electrically connected to each bus bar by cables, wires, wire harnesses, electrical connectors, and the like. In some known battery packs, an electrical conductor of a wire or cable leading to the central controller is directly electrically connected to a corresponding bus bar by soldering, laser welding, or another joining process. But, it may be difficult to provide a reliable electrical connection at the joint using such joining processes because the conductors and the bus bars may be formed of different conductive materials that do not readily join together. For example, the conductors may be copper and the bus bars may be aluminum, and soldering or welding the copper to the aluminum may produce a brittle intermetallic layer at the interface, resulting in a brittle joint. The brittle joint may risk premature breaking, requiring additional maintenance. Furthermore, in at least some known battery packs, the cables or wires are only secured to an assembly that holds the bus bars via the joints formed by soldering or welding the conductors to the bus bars. Thus, the electrical connection points are also the mechanical connection points. Stresses, strains, vibrations, and other forces on the cable or wire are transferred to the joints, which risks damaging the joints and breaking the electrical connection to the bus bars, especially if the joints are already brittle, as described above.

A need remains for improving the reliability of the electrical connections between the bus bars and the conductors of the cable or wire. A need remains for providing strain relief to the cable or wire to reduce forces on the electrical connection joints.

BRIEF DESCRIPTION OF THE INVENTION

In one embodiment, a cover assembly for a battery module that includes battery cells arranged side-by-side in a stacked configuration is provided. The cover assembly is configured to be coupled to the battery cells. The cover assembly includes a housing, a plurality of bus bars, and an electrical cable. The housing is configured to extend a length across the battery cells. The bus bars are held by the housing. The bus bars are configured to electrically connect to corresponding positive and negative cell terminals of the battery cells to electrically connect adjacent battery cells. The cable extends across the bus bars. The cable is electrically connected to each of the bus bars to monitor a voltage across each of the battery cells. The cable includes plural electrical conductors and a dielectric insulator surrounding the conductors and extending between the conductors to electrically isolate the conductors from one another. The conductors of the cable include exposed segments exposed through the dielectric insulator that are electrically connected to corresponding bus bars via a bonding layer applied between the exposed segment and the corresponding bus bar.

Optionally, the bonding layer is composed of a conductive adhesive material that is configured to retain physical engagement with both the exposed segment of the respective conductor and the corresponding bus bar.

In another embodiment, a cover assembly for a battery module that includes battery cells arranged side-by-side in a stacked configuration is provided. The cover assembly is configured to be coupled to the battery cells. The cover assembly includes a housing, a plurality of bus bars, and an electrical cable. The housing is configured to extend a length across the battery cells. The bus bars are held by the housing. The bus bars are configured to electrically connect to corresponding positive and negative cell terminals of the battery cells to electrically connect adjacent battery cells. The cable extends across the bus bars. The cable is electrically connected to each of the bus bars to monitor a voltage across each of the battery cells. The cable includes plural electrical conductors and a dielectric insulator surrounding the conductors and extending between the conductors to electrically isolate the conductors from one another. The conductors of the cable include exposed segments exposed through the dielectric insulator that are electrically connected to corresponding bus bars at junction locations via a bonding layer applied between the exposed segment and the corresponding bus bar. The cable is mechanically secured to the cover assembly at fixation locations to provide strain relief for the cable at the junction locations.

Optionally, the housing includes a post at each fixation location that is configured to extend through a corresponding opening defined in the cable to mechanically secure the cable to the cover assembly. Optionally, the cover assembly further includes crimp terminals crimped to each corresponding bus bar. Each crimp terminal engages the cable to mechanically secure the cable to the corresponding bus bar.

In another embodiment, a cover assembly for a battery module that includes battery cells arranged side-by-side in a stacked configuration is provided. The cover assembly is configured to be coupled to the battery cells. The cover assembly includes a housing, a plurality of bus bars, and an electrical cable. The housing is configured to extend a length across the battery cells. The bus bars are held by the housing. The bus bars are configured to electrically connect to corresponding positive and negative cell terminals of the battery cells to electrically connect adjacent battery cells. The cable extends across the bus bars. The cable is electrically connected to each of the bus bars to monitor a voltage across each of the battery cells. The cable includes plural electrical conductors and a dielectric insulator surrounding the conductors and extending between the conductors to electrically isolate the conductors from one another. The conductors of the cable include exposed segments exposed through the dielectric insulator that are electrically connected to corresponding bus bars at junction locations. The cable is mechanically secured to the cover assembly at fixation locations to provide strain relief for the cable at the junction locations.

DETAILED DESCRIPTION OF THE INVENTION

Figure 1:
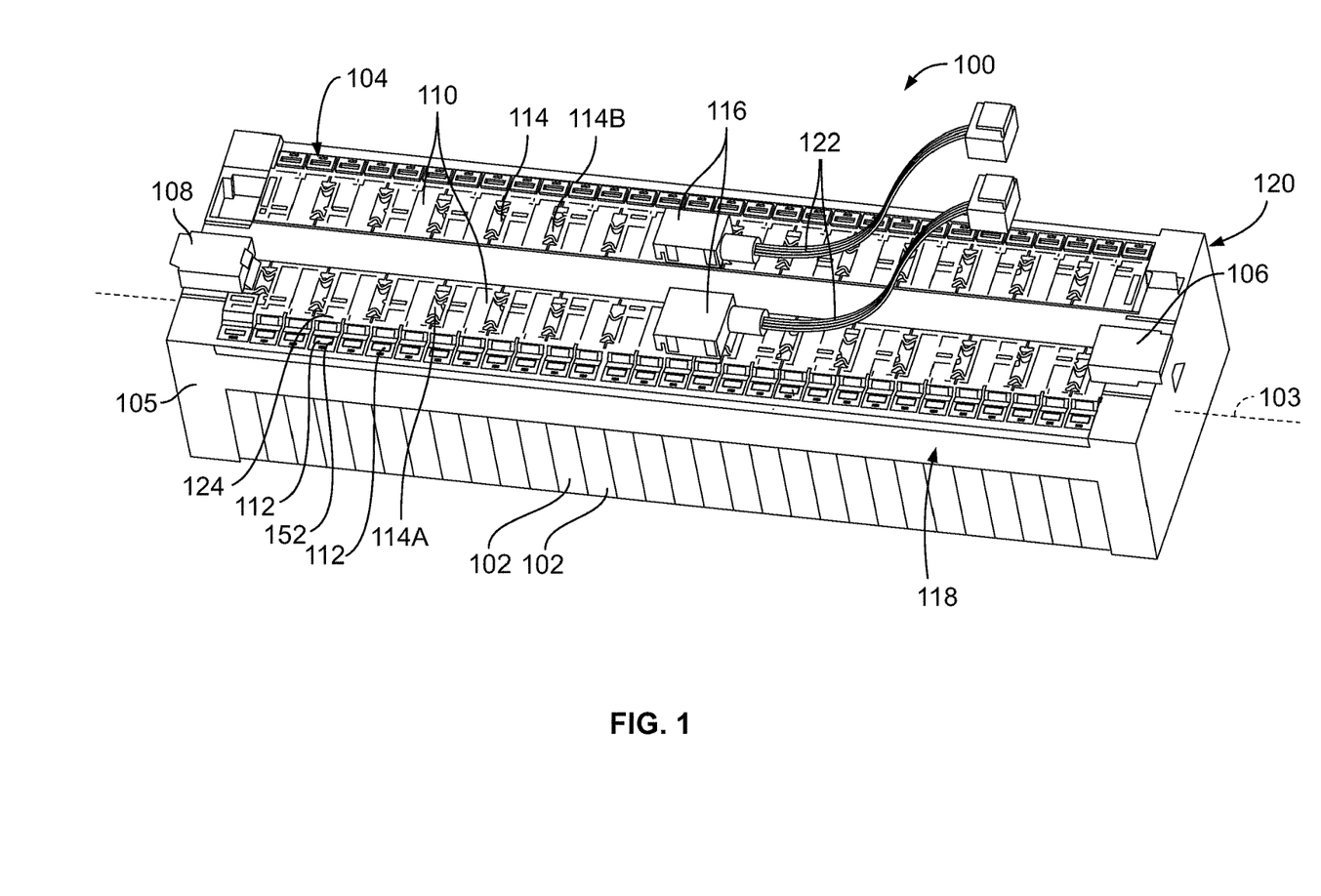
FIG. 1 is a top perspective view of a battery module formed in accordance with an embodiment.

FIG. 1 is a top perspective view of a battery module 100 formed in accordance with an embodiment. The battery module 100 may be used as part of a battery system in a vehicle, such as an electric vehicle or a hybrid electrical vehicle. The battery module 100 may be used in other applications in alternative embodiments.

The battery module 100 includes a plurality of battery cells 102. The battery cells 102 are arranged side-by-side in a stacked configuration along a stack axis 103. The battery cells 102 in an embodiment are prismatic battery cells, but may be other types of battery cells in other embodiments. Optionally, the battery module 100 may include a case 105 that holds the battery cells 102 in the stacked configuration. A cover assembly 104 is provided over the tops of the battery cells 102. The cover assembly 104 is coupled to each of the battery cells 102.

The battery module 100 includes a positive battery terminal 106 and a negative battery terminal 108. The battery terminals 106, 108 are configured to be coupled to an external power cable or alternatively may be bussed to battery terminals of another battery module that is similar to the battery module 100. Each of the battery cells 102 of the battery module 100 includes a positive cell terminal (not shown) and a negative cell terminal (not shown). The cell terminals of each battery cell 102 are generally aligned with corresponding cell terminals of adjacent battery cells 102 near outer edges of the battery cells 102. In an embodiment, the battery cells 102 are arranged such that the positive cell terminal of one battery cell 102 is located between negative cell terminals of the two adjacent battery cells 102, and the negative cell terminal of the one battery cell 102 is located between positive cell terminals of the two adjacent battery cells 102. The cell terminals thus may have an alternating positive-negative-positive-negative configuration.

The cover assembly 104 includes a housing 110 that extends a length across the battery cells 102. For example, the housing 110 may be oriented to extend parallel to the stack axis 103. The cover assembly 104 further includes a plurality of bus bars 112 that are held by the housing 110. The bus bars 112 are shown in more detail in FIG. 2. The bus bars 112 are each configured to electrically connect to two adjacent battery cells 102 that are stacked next to each other in order to provide an electrical current path between the two battery cells 102. For example, each bus bar 112 engages and electrically connects to the positive cell terminal of one battery cell 102 and the negative cell terminal of an adjacent battery cell 102. The bus bars 112 allow electrical energy (for example, current and voltage) to propagate through plural battery cells 102 of the battery module 100 without being restricted to one battery cell 102.

The cover assembly 104 further includes an electrical cable 114 that extends across the bus bars 112. The electrical cable 114 may extend parallel to the stack axis 103. The electrical cable 114 and the bus bars 112 may be disposed vertically between a top cover 124 of the housing 110 and the battery cells 102. The electrical cable 114 is shown in more detail in FIG. 3. The electrical cable 114 is referred to herein as cable 114. In some embodiments, the cover assembly 104 includes more than one cable 114. For example, a first cable 114A is disposed proximate to a front side 118 of the battery module 100, and a second cable 114B is disposed proximate to a rear side 120 of the battery module 100. As used herein, relative or spatial terms such as "top," "bottom," "front," "rear," "left," and "right" are only used to distinguish the referenced elements and do not necessarily require particular positions or orientations in the battery module 100 or in the surrounding environment of the battery module 100.

In an exemplary embodiment, the cable 114 is electrically connected to the bus bars 112 to monitor a voltage across each of the battery cells 102. The cable 114 provides an electrical signal path from the bus bars 112 towards a central controller (not shown). The central controller may be a computer, a processor, or another processing device that is used to analyze and monitor voltages of the battery cells 102 via the bus bars 112 and the cable 114. Optionally, the cable 114 is terminated to an electrical connector 116 that is coupled to a wire harness 122 or a cable, such that the cable 114 provides a first portion of the electrical signal path from the bus bars 112 to the central controller, and the wire harness 122 provides a second portion of the electrical signal path to the central controller. Alternatively, the cable 114 may extend remotely from the cover assembly 104 to directly engage and electrically terminate to the central controller to provide the entire signal path between the bus bars 112 and the central controller.

Figure 2:
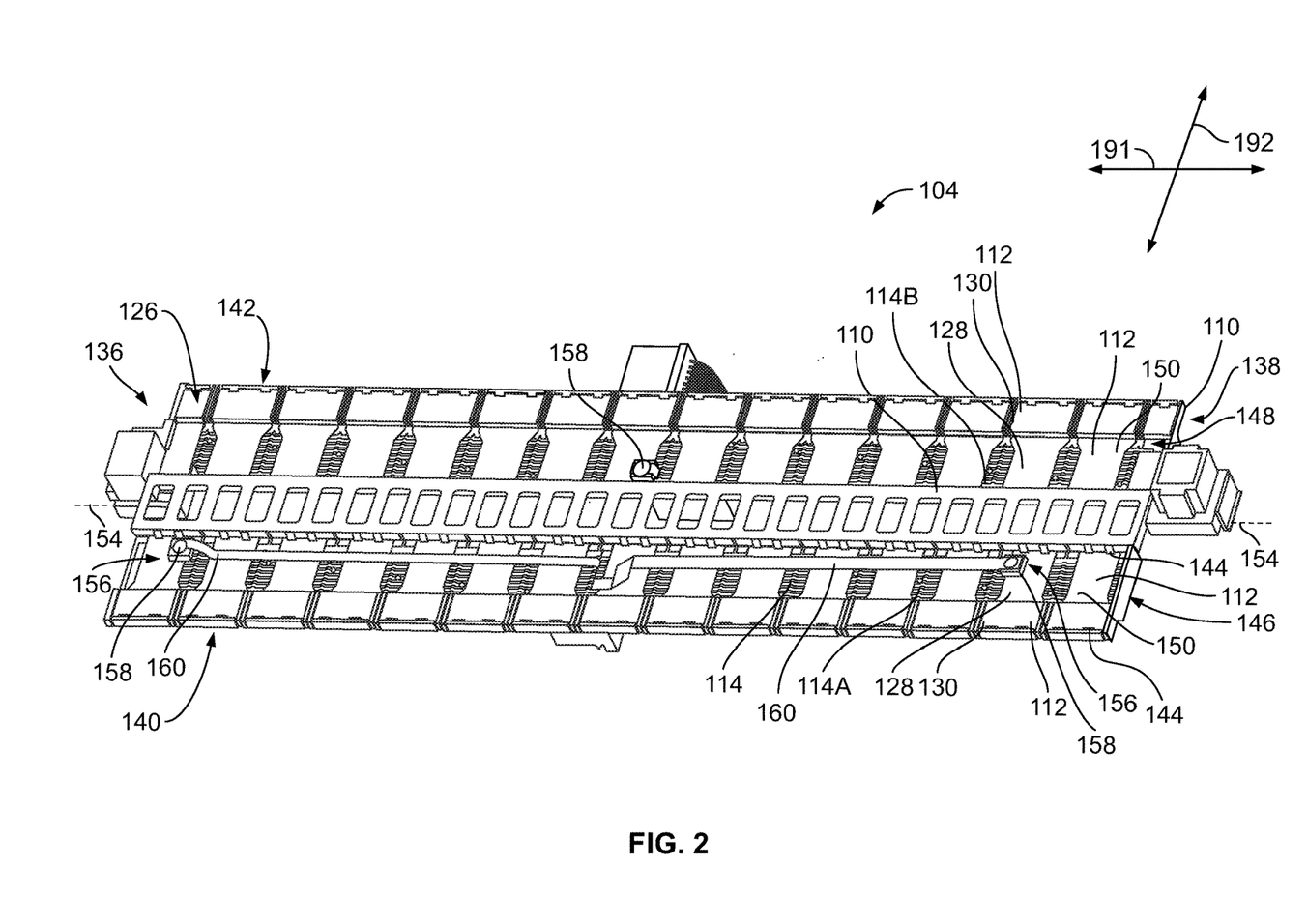
FIG. 2 is a bottom perspective view of a cover assembly of the battery module formed in accordance with an embodiment.

FIG. 2 is a bottom perspective view of the cover assembly 104 of the battery module 100 (shown in FIG. 1) formed in accordance with an embodiment. The visible bottom 126 of the cover assembly 104 is configured to extend across and engage the tops of the battery cells 102 (shown in FIG. 1). The cover assembly 104 extends a length along a longitudinal axis 191 between a first end 136 and a second end 138. The cover assembly 104 extends a width along a lateral axis 192 between a first side 140 and a second side 142. The longitudinal axis 191 is perpendicular to the lateral axis 192.

The housing 110 provides a frame that couples to the bus bars 112 and holds the bus bars 112 in place relative to the housing 110. For example, the housing 110 includes retention features 144, such as deflectable latches, interference barbs, and/or the like that engage the bus bars 112 and mechanically secure the bus bars 112 to the housing 110. The bus bars 112 are arranged in first and second parallel rows 146, 148 that extend along the longitudinal axis 191. The first and second rows 146, 148 are spaced apart from one another along the width of the cover assembly 104. For example, the first row 146 is located proximate to the first side 140 of the cover assembly 104, and the second row 148 is located proximate to the second side 142. The bus bars 112 each include a bottom surface 150 and an opposite top surface 152 (shown in FIG. 1). The bottom surface 150 is configured to face the battery cells 102 (shown in FIG. 1). The top surface 152 faces the top cover 124 (shown in FIG. 1) of the housing 110.

Each bus bar 112 includes a base portion 128 and a terminal portion 130 that extends from the base portion 128. Each bus bar 112 is oriented to extend generally along the lateral axis 192 with the base portion 128 disposed more proximate (than the terminal portion 130) to a central longitudinal axis 154 that bisects the width of the cover assembly 104. The terminal portions 130 of the bus bars 112 in the first row 146 extend from the corresponding base portions 128 to the first side 140 of the cover assembly 104. Similarly, the terminal portions 130 of the bus bars 112 in the second row 148 extend from the corresponding base portions 128 to the second side 142 of the cover assembly 104. The base portion 128 is configured to engage and be electrically connected to the cable 114. The terminal portion 130 is configured to engage the cell terminals (not shown) of the battery cells 102 (shown in FIG. 1) to electrically connect the respective bus bar 112 to the battery cells 102. For example, one section of the terminal portion 130 of a corresponding bus bar 112 may engage the positive cell terminal of a first battery cell 102 and another section engages the negative cell terminal of a second battery cell 102 that is adjacent to the first battery cell 102.

The cover assembly 104 includes a first cable 114A that extends across the first row 146 of bus bars 112 and a second cable 114B that extends across the second row 148 of bus bars 112. Each of the cables 114A, 114B is electrically connected to the bus bars 112 in the respective rows 146, 148 in order to monitor a voltage across the battery cells 102 (shown in FIG. 1). In an embodiment, the cables 114A, 114B extend across and engage the base portions 128 of the corresponding bus bars 112. In the illustrated embodiment, the cables 114A, 114B are disposed between the corresponding bus bars 112 and the top cover 124 (shown in FIG. 1) of the housing 110. For example, the cables 114A, 114B engage in physical contact with the top surfaces 152 (shown in FIG. 1) of the corresponding bus bars 112 and the top cover 124. In an alternative embodiment, however, the cables 114A, 114B may engage in physical contact with the bottom surfaces 150 of the corresponding bus bars 112, such that the base portions 128 of the bus bars 112 are disposed vertically between the corresponding cables 114A, 114B and the top cover 124.

The cover assembly 104 optionally includes one or more supplemental sensing circuits 156 that include sensors 158 and associated circuitry 160 for monitoring other parameters of the battery module 100 (shown in FIG. 1), such as temperature, pressure, and the like. In the illustrated embodiment, the circuitry 160 of two such sensing circuits 156 extends across the bottom surface 150 of the bus bars 112 in the first row 146.

Figure 3:
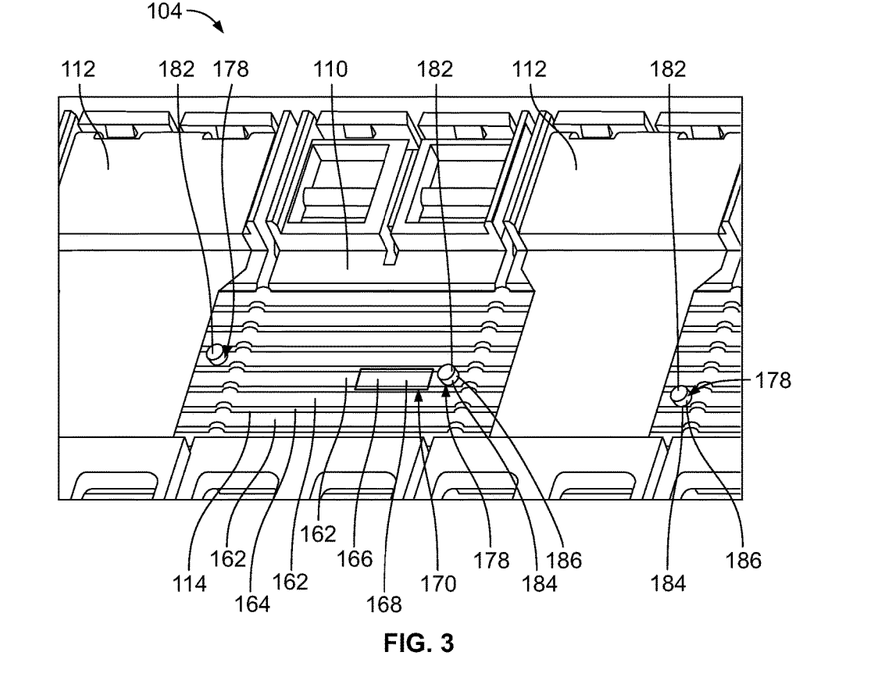
FIG. 3 is a bottom perspective view of a portion of the cover assembly shown in FIG. 2 according to an embodiment.

FIG. 3 is a bottom perspective view of a portion of the cover assembly 104 according to an embodiment. The portion of the cover assembly 104 shows bus bars 112 arranged along a common row, which may be the first row 146 or the second row 148 shown in FIG. 2. In the illustrated embodiment, one of the bus bars 112 is removed to better show the cable 114. The cable 114 may be the first cable 114A or the second cable 114B shown in FIG. 2. The cable 114 includes plural electrical conductors 162 and a dielectric insulator 164 surrounding the conductors 162. The dielectric insulator 164 extends around the conductors 162 and also between the conductors 162 in order to electrically isolate the conductors 162 from one another. In an embodiment, the cable 114 is a planar ribbon cable, and the conductors 162 are arranged side-by-side across a width of the cable 114. The dielectric insulator 164 is interspersed between adjacent conductors 162 across the width to electrically isolate the conductors 162 from one another. The conductors 162 are metallic strips or wires that are formed of copper or the like. The dielectric insulator 164 may be formed of a dielectric material, such as one or more plastics or other polymers. In another embodiment, the cable 114 is a flexible printed circuit board. The conductors 162 may be metal traces that are arranged side-by-side across a width of a non-conductive substrate that defines the dielectric insulator 164.

In an exemplary embodiment, the conductors 162 of the cable 114 include exposed segments 166 that are exposed through the dielectric insulator 164. The exposed segments 166 are configured to engage corresponding bus bars 112 to electrically connect the cable 114 to the bus bars 112. The respective conductor 162 is not fully encapsulated by the dielectric insulator 164 along the exposed segment 166 such that at least a portion of the conductor 162 along the exposed segment 166 is exposed to an exterior environment. In the illustrated embodiment, at least one broad side 168 of the respective conductor 162 is exposed through the dielectric insulator 164 along the exposed segment 166. In an embodiment, each conductor 162 of the cable 114 includes one exposed segment 166 that is configured to engage one bus bar 112. Each conductor 162 is therefore electrically connected to only one corresponding bus bar 112, and that conductor 162 provides an electrical signal path from the corresponding bus bar 112 towards the central controller to monitor the electrical energy across the bus bar 112. The cable 114 includes at least as many conductors 162 as the number of bus bars 112 that the cable 114 extends across in order for each of the bus bars 112 to be electrically connected to the exposed segment 166 of a different one of the conductors 162.

In an embodiment, the exposed segments 166 of the conductors 162 extend through windows 170 that are defined in the dielectric insulator 164. For example, a broad side 168 of each conductor 162 along the exposed segment 166 is exposed to the exterior environment through the corresponding window 170. The windows 170 are voids in the dielectric insulator 164 that extend inward from an outer surface of the dielectric insulator 164 to a surface of a corresponding conductor 162 within the dielectric insulator 164. Each window 170 aligns with a portion of one of the conductors 162. The window 170 defines the exposed segment 166 of the respective conductor 162. For example, the exposed segment 166 of each conductor 162 is the portion of the conductor 162 that aligns with the window 170. In an embodiment, only one conductor 162 is exposed through each window 170. For example, the window 170 may have a designated width and location relative to the width of the cable 114 such that a single window 170 does not expose portions of two adjacent conductors 162. Each window 170 may be formed concurrently with the formation of the cable 114 or may be formed subsequent to the formation of the cable 114 by removing material via laser-cutting or a like process.

Figure 4:
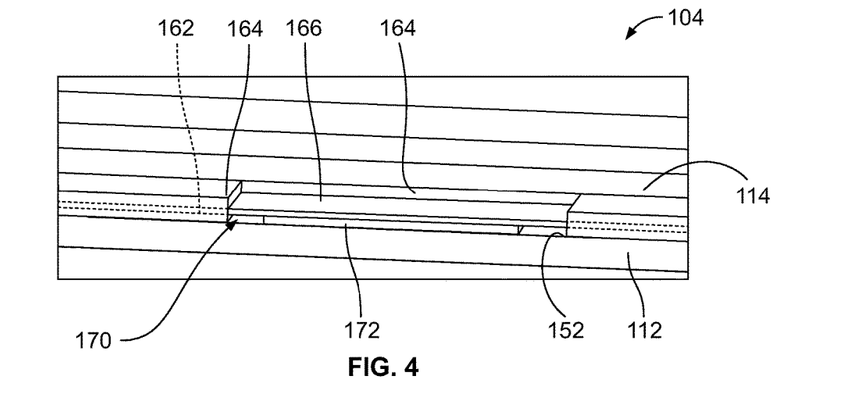
FIG. 4 is a close-up cross-sectional view of a junction between an electrical cable and a bus bar of the cover assembly according to an embodiment.

FIG. 4 is a close-up cross-sectional top view of a junction between the cable 114 and one of the bus bars 112 of the cover assembly 104 according to an embodiment. The cable 114 extends across the top surface 152 of the bus bar 112. The exposed segment 166 of the respective conductor 162 shown in FIG. 4 is electrically connected to the bus bar 112 at the junction to electrically connect the conductor 162 to the bus bar 112. In an exemplary embodiment, the exposed segment 166 is electrically connected to the corresponding bus bar 112 via a bonding layer 172 applied between the exposed segment 166 and the bus bar 112. The bonding layer 172 is conductive and provides an electrical current path between the conductor 162 and the bus bar 112. The bonding layer 172 is also adhesive and is configured to retain physical engagement with both the exposed segment 166 (on one side of the bonding layer 172) and the bus bar 112 (on the other side of the bonding layer 172). Thus, the bonding layer 172 may be composed of a conductive adhesive material that includes both electrically conductive properties as well as adhesive properties.

The bonding layer 172 may be in the form of a tape, a paste, a gel, or the like. The adhesive properties of the bonding layer 172 may be temperature or pressure activated during the production of the cover assembly 104. The bonding layer 172 may have a surface area that is less than a surface area of the window 170. For example, the bonding layer 172 may be applied in select locations and select amounts such that the bonding layer 172 engages the exposed segment 166 of the conductor 162 but does not engage the dielectric insulator 164 of the cable 114 surrounding the exposed segment 166. In an alternative embodiment, the bonding layer 172 engages at least a portion of the dielectric insulator 164 of the cable 114 in addition to engaging the exposed segment 166 of the conductor 162.

In an embodiment, the bonding layer 172 is a conductive epoxy that bonds to both the exposed segment 166 of the conductor 162 and the corresponding bus bar 112. The conductive epoxy may include an epoxy resin base and metal particles dispersed throughout the epoxy resin base to provide conductive properties. The metal particles may be in the form of a powder, flakes, fibers, or the like.

The bonding layer 172 is configured to engage and bond to both the conductor 162 and the bus bar 112, even though the conductor 162 and the bus bar 112 may be formed of different conductive materials. For example, the conductor 162 may be formed of copper and the bus bar 112 may be formed of aluminum. It may be difficult to produce a reliable electrical connection between a copper conductor 162 and an aluminum bus bar 112 via traditional connection methods, such as soldering and welding, due in part to a brittle intermetallic layer that forms between the two metals. The bonding layer 172 is configured to bond to both the copper conductor 162 and the aluminum bus bar 112 without forming a brittle intermetallic layer therebetween. As a result, the electrical connection at the junction may be more reliable (for example, providing more consistent electrical current propagation over a longer effective lifetime) than an electrical connection formed by soldering or welding the two different metals.

Figure 5:
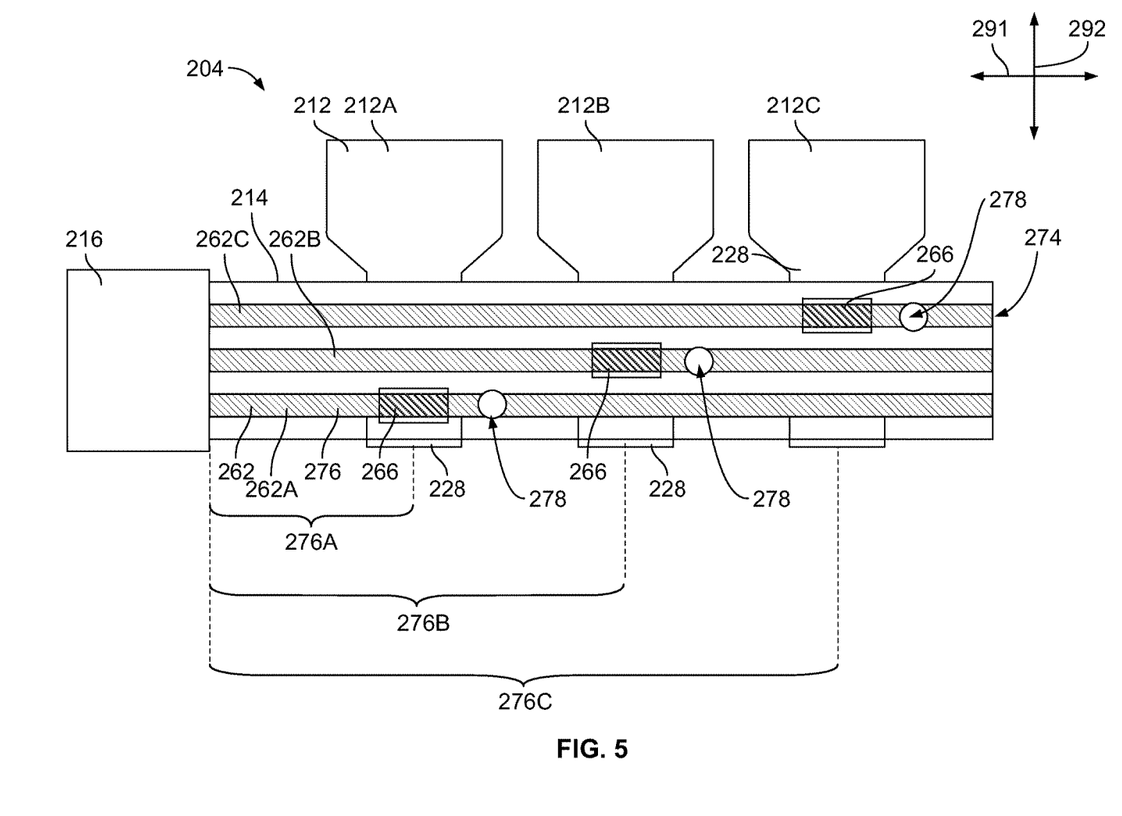
FIG. 5 is a top view of a portion of a cover assembly including an electrical cable extending across three bus bars according to an embodiment.

FIG. 5 is a top view of a portion of a cover assembly 204 including an electrical cable 214 extending across three bus bars 212 according to an embodiment. The bus bars 212 and the cable 214 may be similar to the respective bus bars 112 and cable 114 shown in FIGS. 1-4. The cable 214 is terminated to an electrical connector 216, which may be similar to the electrical connector 116 shown in FIG. 1. The cable 214 extends a length along a longitudinal axis 291 between the electrical connector 216 and a distal end 274. The cable 214 includes three conductors 262 that are spaced apart from one another along a width of the cable 214 (that extends along a lateral axis 292). Each conductor 262 extends the full length of the cable 214. In an embodiment, each conductor 262 is electrically connected to a corresponding one of the bus bars 212. For example, a first conductor 262A is electrically connected to a first bus bar 212A that is most proximate to the electrical connector 216, a second conductor 262B is electrically connected to a second bus bar 212B that is between the first bus bar 212A and a third bus bar 212C, and a third conductor 262C is electrically connected to the third bus bar 212C that is farthest from the electrical connector 216. Although the second conductor 262B is between the first and third conductors 262A, 262C in the illustrated embodiment, in other embodiments the conductors 262A-C may have other relative arrangements.

The exposed segments 266 of the conductors 262 are aligned longitudinally (along the longitudinal axis 291) with the base portions 228 of the corresponding bus bars 212. Thus, the exposed segment 266 of the first conductor 262A is spaced apart from the exposed segments 266 of the second conductor 262B and the third conductor 262C along the longitudinal axis 291. As described above, the exposed segments 266 may be electrically connected to the corresponding bus bars 212 at respective junctions via the bonding layer 172 (shown in FIG. 4). Each of the bus bars 212A-C is electrically connected to the exposed segment 266 of a different one of the conductors 262A-C of the cable 214.

In an embodiment, the conductors 262 of the cable 214 define electrical current paths that extend between the respective exposed segments 266 and the electrical connector 216. The electrical current paths are referred to as voltage monitoring paths 276 as these lengths of the conductors 262 are used to convey electrical signals between the electrical connector 216 and the corresponding bus bars 212 to monitor a voltage across the battery cells 102 (shown in FIG. 1) engaged by the bus bars 212. The voltage monitoring path 276A of the first conductor 262A is shorter than the voltage monitoring path 276B of the second conductor 262B, which itself is shorter than the voltage monitoring path 276C of the third conductor 262C.

The remaining lengths of the conductors 262 outside of the respective voltage monitoring paths 276 are not used in the transmission of signals for voltage monitoring purposes. Such portions of the conductors 262 may have a detrimental effect on the voltage monitoring signal quality if electrically connected to the voltage monitoring paths 276 due to electrical interference and creepage across the conductors 262. For example, it is possible for electrical current to leak or creep across the conductors 262, such as at the distal end 274 of the cable 214 which may interfere with voltage monitoring and also may potentially damage the cable 214.

In an embodiment, the cable 214 defines multiple openings 278 that extend through the conductors 262 outside of the voltage monitoring paths 276. The openings 278 are configured to break the electrical current paths to prohibit such electrical interference and creepage from interfering with voltage monitoring. For example, the openings 278 each extend through one of the conductors 262, separating the corresponding conductor 262 into two disjointed segments that are electrically isolated from one another. In the illustrated embodiment, the cable 214 defines three openings 278 that each extend through a different one of the conductors 262. Each opening 278 is located along the length of the corresponding conductor 262 outside of the respective voltage monitoring path 276 (for example, outside of the portion of the electrical current path between the exposed segment 266 and the electrical connector 216). Due to the openings 278 that break the current paths through the conductors 262, the portions of the conductors 262 at the distal end 274 of the cable 214 are electrically isolated from the voltage monitoring paths 276 and the electrical connector 216. Therefore, any interference or creepage at the distal end 274 does not interfere with the voltage monitoring.

Referring now back to FIG. 3, in an embodiment, the cable 114 is mechanically secured to the cover assembly 104 (such as to the housing 110 and/or the bus bars 112) at fixation locations to provide strain relief for the cable 114 at the junctions where the conductors 162 are electrically connected to the bus bars 112. In the illustrated embodiment, the housing 110 includes posts 182 that are configured to extend through corresponding openings 178 defined in the cable 114. The openings 178 may be similar to the openings 278 shown in FIG. 5, such that the openings 178 separate the respective conductors 162 into two disjointed electrically-isolated segments. Thus, the openings 178 may be used for electrical purposes (for example, reducing interference and creepage between conductors 162) and also mechanical purposes (for example, receiving the posts 182 to secure the cable 114 to the housing 110). At each fixation location, one post 182 extends through a corresponding opening 178 in the cable 114 to mechanically secure the cable 114 to the cover assembly 104. The posts 182 provide strain relief for the electrical junctions because the mechanical interaction between the posts 182 and the openings 178 is configured to absorb forces applied to the cable 114, such as stresses, strains, and vibrations, to reduce the forces experienced at the junctions. Thus, the forces experienced at the bonding layer 172 (shown in FIG. 4) may be reduced.

Optionally, the posts 182 each include a protrusion 184 that extends from the post 182, such that the post 182 has a different shape and/or an increased diameter along the portion that includes the protrusion 184. The protrusion 184 is configured to engage a surface of the cable 114 around the corresponding opening 178 to retain the cable 114 on the post 182. For example, the protrusion 184 may have a sloped surface 186 that is configured to engage an edge of the opening 178 as the cable 114 is being loaded onto the post 182. The protrusion 184 also may include a catch surface (not shown) that is spaced apart from and faces a base (not shown) of the housing 110 from which the post 182 extends. The catch surface is configured to engage the surface of the cable 114 around the corresponding opening 178 to increase the force required to remove the cable 114 from the post 182.

Figure 6:
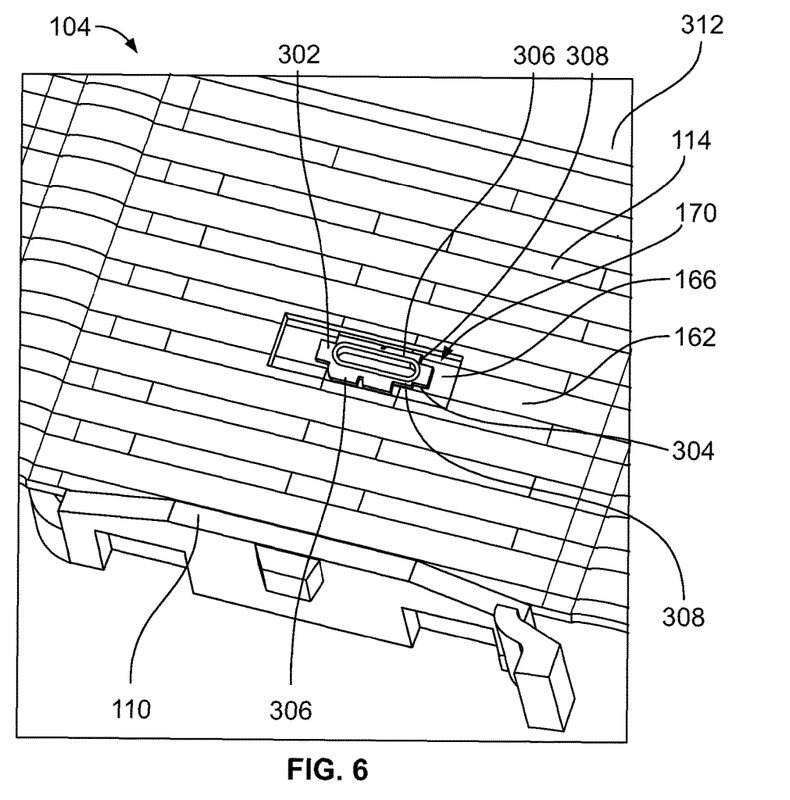
FIG. 6 is a close-up top view of a portion of the cover assembly according to an alternative embodiment.

FIG. 6 is a close-up top view of a portion of the cover assembly 104 according to an alternative embodiment. In the illustrated embodiment, the cover assembly 104 further includes crimp terminals 302 that are crimped to corresponding bus bars 312. Each crimp terminal 302 engages the cable 114 to mechanically secure the cable 114 to the corresponding bus bar 312 and provide strain relief at the junctions. The crimp terminals 302 may be used to mechanically secure the cable 114 to the cover assembly 104 instead of, or in addition to, the posts 182 (shown in FIG. 3) of the housing 110 extending through the openings 178 (FIG. 3) in the cable 114. For example, although not shown in FIG. 6, the cable 114 may define the openings 178 in the conductors 162 in order to divide the conductors 162 each into two disjointed electrically-isolated segments, even if the openings 178 are not used to mechanically secure the cable 114 to the cover assembly 104.

In an embodiment, each crimp terminal 302 engages the exposed segment 166 of one of the conductors 162 within a window 170 of the cable 114. Thus, the fixation location, where the cable 114 is mechanically secured to the cover assembly 104, may at least partially overlap the junction where the conductor 162 is electrically connected to the corresponding bus bar 312. The crimp terminal 302 includes a base 304 and wings 306 that extend from opposing edges 308 of the base 304. Optionally, the base 304 may engage the exposed segment 166 of the conductor 162 and the wings 306 extend from the base 304 to engage the bus bar 312. Thus, the crimp terminals 302 each extend around and engage both the conductor 162 and the corresponding bus bar 312. The crimp terminals 302 are formed of a conductive metal material. In an embodiment, in addition to providing mechanical strain relief, the crimp terminal 302 provides a conductive current path to electrically connect the conductor 162 to the corresponding bus bar 312. The crimp terminal 302 may be used in addition to, or as an alternative to, the bonding layer 172 (shown in FIG. 4) that is applied between the conductor 162 and the bus bar 312.

Figure 7:
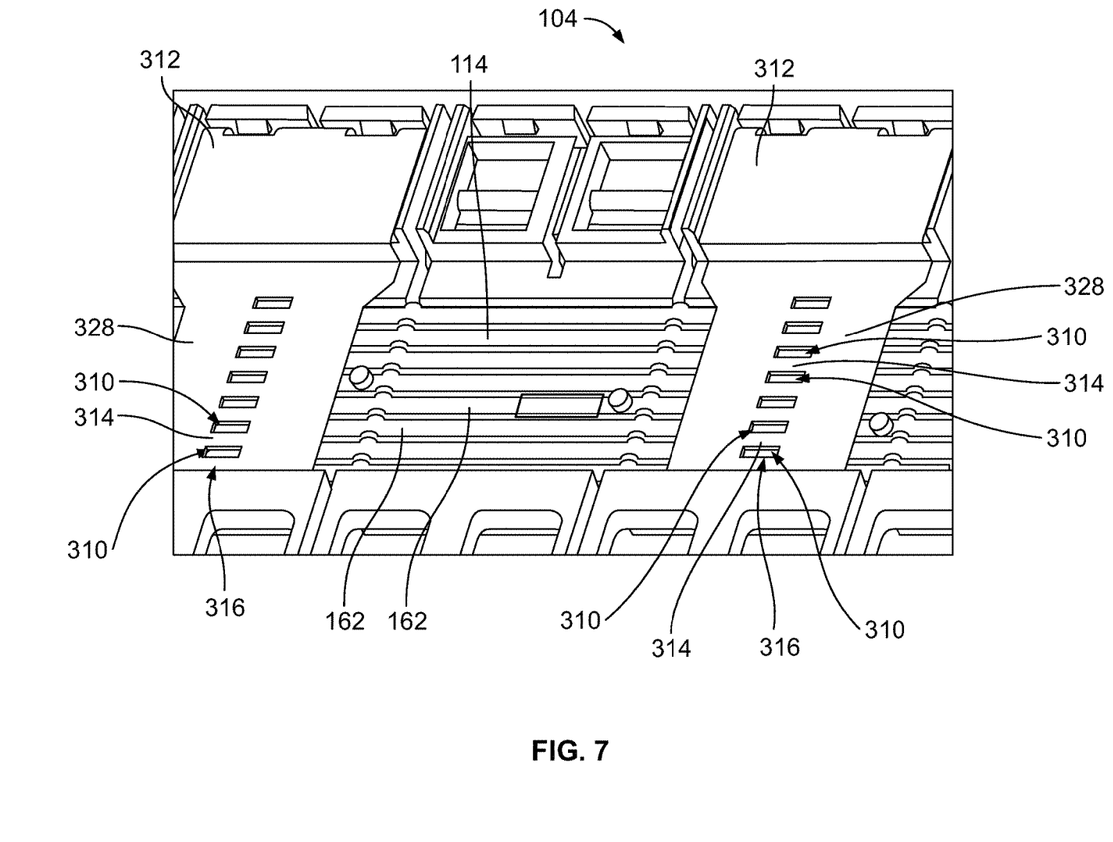
FIG. 7 is a bottom perspective view of a portion of the cover assembly according to the embodiment shown in FIG. 6.

FIG. 7 is a bottom perspective view of a portion of the cover assembly 104 according to the embodiment shown in FIG. 6. The bus bars 312 shown in FIG. 7 differ from the bus bars 112 shown in FIG. 3 in that the bus bars 312 each define at least two slots 310 and bridges 314 disposed between adjacent slots 310. The slots 310 in the illustrated embodiment are arranged in a column 316 that extends along the base portion 328 of each of the bus bars 312. The bridges 314 between the slots 310 each align generally with one of the conductors 162 of the cable 114. The slots 310 are each configured to receive at least one wing 306 (shown in FIG. 6) of a crimp terminal 302 (FIG. 6) therethrough. Optionally, each bus bar 312 is configured to be crimped to only one conductor 162 of the cable 114 such that only two slots 310 and one bridge 314 is used. But, the bus bars 312 in the illustrated embodiment each define a sufficient number of slots 310 and bridges 314 to engage any of the conductors 162 across the width of the cable 114 to allow for each of the bus bars 312 to have an identical shape, to avoid specially manufacturing the bus bars 312 with slots 310 and bridges 314 in different locations.

Figure 8:
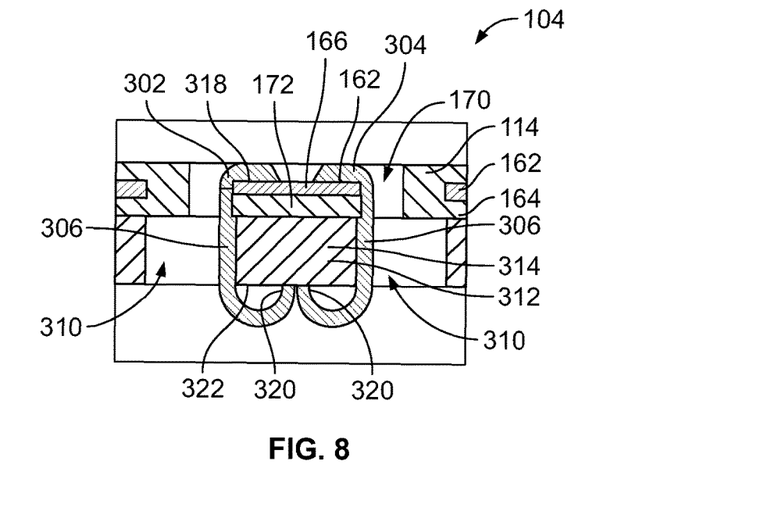
FIG. 8 is a side cross-sectional view of a portion of the cover assembly according to the embodiment shown in FIGS. 6 and 7 showing a crimp terminal crimped to both a conductor and a corresponding bus bar.

FIG. 8 is a side cross-sectional view of a portion of the cover assembly 104 according to the embodiment shown in FIGS. 6 and 7 showing a crimp terminal 302 crimped to both a conductor 162 and a corresponding bus bar 312. In the illustrated embodiment, the exposed segment 166 of the conductor 162 is electrically connected to the bridge 314 of the bus bar 312 via the bonding layer 172 that is applied between the exposed segment 166 and the bridge 314. The base 304 of the crimp terminal 302 engages a top surface 318 of the exposed segment 166. The wings 306 of the crimp terminal 302 extend from the base 304 through both the window 170 of the dielectric insulator 164 and corresponding slots 310 in the bus bar 312 around the bridge 314. Distal tips 320 of the wings 306 are curled over and engage a bottom surface 322 of the bridge 314. Thus, the crimp terminal 302 extends around and engages the exposed segment 166 and the bridge 314 to mechanically secure the cable 114 to the bus bar 312, whether or not the bonding layer 172 is disposed between the exposed segment 166 and the bridge 314. Optionally, the metal material of the crimp terminal 302 may be a harder metal than the metal material of the bus bar 312, such as aluminum for example, and the distal tips 320 of the wings 306 may penetrate the bottom surface 322 of the bridge 314 during the crimping process.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A cover assembly for a battery module that includes battery cells arranged side-by-side in a stacked configuration, the cover assembly configured to be coupled to the battery cells, the cover assembly comprising:
   a housing configured to extend a length across the battery cells;
   a plurality of bus bars held by the housing, the bus bars configured to electrically connect to corresponding positive and negative cell terminals of the battery cells to electrically connect adjacent battery cells; and
   an electrical cable extending from an electrical connector across the bus bars to a distal end of the cable, the cable being electrically connected to the bus bars to monitor a voltage across each of the battery cells, the cable including plural electrical conductors and a dielectric insulator surrounding the conductors and extending between the conductors to electrically isolate the conductors from one another, the conductors of the cable including exposed segments exposed through the dielectric insulator that are electrically connected to corresponding bus bars via a bonding layer applied between the exposed segment and the corresponding bus bar, each of the conductors defining a respective electrical current path that extends from the exposed segment to the electrical connector,
   wherein the cable defines multiple openings that each extends through a different one of the conductors and separates the corresponding conductor into two disjointed segments that are electrically isolated from one another, wherein each opening is located outside of the respective electrical current path defined by the corresponding conductor and is spaced apart from the distal end of the cable, wherein at most only one of the conductors continuously extends a full length of the cable from the electrical connector to the distal end.

2. The cover assembly of claim 1, wherein the bonding layer is composed of a conductive adhesive material that is configured to retain physical engagement with both the exposed segment of the respective conductor and the corresponding bus bar.

3. The cover assembly of claim 1, wherein the dielectric insulator includes multiple windows, each window aligning with a portion of one of the conductors and defining the exposed segment of that conductor.

4. The cover assembly of claim 1, wherein the bonding layer is a conductive adhesive material that includes an epoxy base and metal particles dispersed throughout the epoxy base.

5. The cover assembly of claim 1, wherein the cable is a planar ribbon cable and the conductors of the cable are arranged side-by-side across a width of the ribbon cable.

6. The cover assembly of claim 1, wherein the cable is a flexible printed circuit board.

7. The cover assembly of claim 1, wherein each of the bus bars is electrically connected to the exposed segment of a different one of the conductors of the cable.

8. The cover assembly of claim 1, wherein the housing includes multiple posts that are electrically insulative, and each of the posts extends through a different one of the openings in the cable to mechanically secure the cable to the housing.

9. A cover assembly for a battery module that includes battery cells arranged side-by-side in a stacked configuration, the cover assembly configured to be coupled to the battery cells, the cover assembly comprising:
   a housing configured to extend a length across the battery cells, the housing including multiple posts;
   a plurality of bus bars held by the housing, the bus bars configured to electrically connect to corresponding positive and negative cell terminals of the battery cells to electrically connect adjacent battery cells; and
   an electrical cable extending across the bus bars, the cable being electrically connected to the bus bars to monitor a voltage across each of the battery cells, the cable including plural electrical conductors and a dielectric insulator surrounding the conductors and extending between the conductors to electrically isolate the conductors from one another, the conductors of the cable including exposed segments exposed through the dielectric insulator that are electrically connected to corresponding bus bars at junction locations via a bonding layer applied between the exposed segment and the corresponding bus bar, wherein the cable is mechanically secured to the housing at fixation locations to provide strain relief for the cable at the junction locations,
   wherein the cable defines multiple openings at the fixation locations, each opening extending through a different one of the conductors and separating the corresponding conductor into two disjointed segments that are electrically isolated from one another, wherein each of the posts of the housing extends through a different one of the openings in the cable to mechanically secure the cable to the housing.

10. The cover assembly of claim 9, wherein the bonding layer is composed of a conductive adhesive material that is configured to retain physical engagement with both the exposed segment of the respective conductor and the corresponding bus bar.

11. The cover assembly of claim 9, wherein each post includes a protrusion configured to engage a broad side of the cable surrounding the corresponding opening to retain the cable on the post.

12. The cover assembly of claim 9, further comprising crimp terminals crimped to each corresponding bus bar, each crimp terminal engaging the cable to mechanically secure the cable to the corresponding bus bar.

13. The cover assembly of claim 12, wherein each crimp terminal extends around and engages both the exposed segment of one of the conductors and the corresponding bus bar to electrically connect the conductor to the bus bar.

14. The cover assembly of claim 12, wherein each bus bar defines two slots and a bridge therebetween, the exposed segment of one of the conductors being electrically connected to the bridge of the corresponding bus bar via the bonding layer, the terminal having a base that engages the exposed segment of the conductor, the terminal having wings extending from opposing edges of the base, the wings extending through the slots to engage the bridge.

15. The cover assembly of claim 9, wherein the cable is electrically terminated to an electrical connector, each of the conductors of the cable defining an electrical current path that extends between the exposed segment of the respective conductor and the electrical connector, the cable defining multiple openings, each opening extending through a different one of the conductors and separating the corresponding conductor into two disjointed segments that are electrically isolated from one another, wherein each opening is located along the length of the corresponding conductor outside of the respective electrical current path.

16. A cover assembly for a battery module that includes battery cells arranged side-by-side in a stacked configuration, the cover assembly configured to be coupled to the battery cells, the cover assembly comprising:
   a housing configured to extend a length across the battery cells, the housing including multiple posts;
   a plurality of bus bars held by the housing, the bus bars configured to electrically connect to corresponding positive and negative cell terminals of the battery cells to electrically connect adjacent battery cells; and
   an electrical cable extending across the bus bars, the cable being electrically connected to the bus bars to monitor a voltage across each of the battery cells, the cable including plural electrical conductors and a dielectric insulator surrounding the conductors and extending between the conductors to electrically isolate the conductors from one another, the conductors of the cable including exposed segments exposed through the dielectric insulator that are electrically connected to corresponding bus bars at junction locations, wherein the cable is mechanically secured to the housing at fixation locations to provide strain relief for the cable at the junction locations,
   wherein the cable defines multiple openings at the fixation locations, each opening extending through a different one of the conductors and separating the corresponding conductor into two disjointed segments that are electrically isolated from one another, wherein each of the posts of the housing extends through a different one of the openings in the cable to mechanically secure the cable to the housing.

17. The cover assembly of claim 16, wherein the exposed segment of each of the conductors is electrically connected to the corresponding bus bar via a bonding layer applied between the exposed segment and the corresponding bus bar, the bonding layer being composed of a conductive adhesive material that is configured to retain physical engagement with both the exposed segment of the respective conductor and the corresponding bus bar.

18. The cover assembly of claim 16, further comprising crimp terminals crimped to each corresponding bus bar, each crimp terminal engaging the cable to mechanically secure the cable to the corresponding bus bar.

19. The cover assembly of claim 18, wherein each bus bar includes multiple bridges arranged in a column with adjacent bridges defined between slots through the bus bar, the bridges aligning with the conductors of the cable, wherein a first crimp terminal engages a first conductor of the conductors and a bridge of a first bus bar located at an end of the column of multiple bridges, and wherein a second crimp terminal engages a second conductor of the conductors and a bridge of a second bus bar that is spaced apart from an end of the column of the multiple bridges.

20. The cover assembly of claim 16, wherein the electrical cable extends from an electrical connector across the bus bars to a distal end of the cable, wherein the openings through the conductors are spaced apart from the distal end and at most only one of the conductors continuously extends a full length of the cable from the electrical connector to the distal end.

\* \* \* \* \*